United States Patent [19]

Lyu et al.

[11] Patent Number: 5,579,315
[45] Date of Patent: Nov. 26, 1996

[54] HEARTBEAT COLLISION PREVENTION CIRCUIT AND METHOD

[75] Inventors: Hyung L. Lyu, Seoul; Dong H. Lee, Kyungki-Do, both of Rep. of Korea

[73] Assignee: Goldstar Electron Co., Ltd., Choongchungbook-Do, Rep. of Korea

[21] Appl. No.: 369,457

[22] Filed: Jan. 6, 1995

[30] Foreign Application Priority Data

Apr. 14, 1994 [KR] Rep. of Korea ............... 7860/1994

[51] Int. Cl.⁶ .................................. H04L 12/407
[52] U.S. Cl. ............... 370/85.2; 370/85.6; 370/85.11; 340/825.5
[58] Field of Search ............... 370/85.1, 85.2, 370/85.3, 85.9, 85.11, 85.6, 100.1, 95.1, 95.3, 93; 340/825.2, 825.06, 825.07, 825.08, 825.14, 825.5, 825.51, 825.52

[56] References Cited

U.S. PATENT DOCUMENTS

| | | | |
|---|---|---|---|
| 4,156,112 | 5/1979 | Moreland | 370/85.11 |
| 4,656,627 | 4/1987 | Hasley et al. | 370/85.11 |
| 4,860,006 | 8/1989 | Barall | 370/85.2 |
| 5,400,332 | 3/1995 | Imai | 370/85.11 |

Primary Examiner—Douglas W. Olms
Assistant Examiner—Chau T. Nguyen
Attorney, Agent, or Firm—Lowe, Price, LeBlanc & Becker

[57] ABSTRACT

Heartbeat collision prevention circuit and method in a network in which a plurality of stations are connected to data and heartbeat lines. The heartbeat collision prevention circuit comprises a first delay element for delaying a clock signal, an OR gate for ORing an output signal from the first delay element and the heartbeat signal, an edge detector for detecting an edge of an output signal from the OR gate, a shift register for loading data from a central processing unit and shifting the laded data in response to an output signal from the edge detector, a second delay element being enabled in response to the output signal from the edge detector to delay the clock signal, an AND gate for ANDing an output signal from the second delay element and an enable signal, a slot time counter being enabled in response to the output signal from the edge detector to count an output signal from the AND gate, a signal operation unit for logically combining a plurality of output signals from the slot time counter and a plurality of output signals from the shift register and outputting the resultant signal as a slot time, and a reset unit for logically combining an output signal from the signal operation unit and the output signal from the edge detector and outputting the resultant signal as a reset signal to the slot time counter.

20 Claims, 5 Drawing Sheets

HEARTBEAT SIGNAL

STATION#1

STATION#2

STATION#3

STATION#4 (MASTER)

OUTPUT SIGNAL FROM OR1

EDGE DETECTING SIGNAL

STATION#1

STATION#2

STATION#3

STATION#4

FIG. 6

| SET | RESET | CK | Q3 | Q2 | Q1 | Q0 |
|-----|-------|----|----|----|----|----|
| 0 | 1 | X | 1 | 1 | 1 | 1 |
| 1 | 1 | ↓ | 1 | 1 | 1 | 0 |
| 1 | 1 | ↓ | 1 | 1 | 0 | 1 |
| 1 | 1 | ↓ | 1 | 1 | 0 | 0 |
| 1 | 1 | ↓ | 1 | 0 | 1 | 1 |
| ⋮ | | | ⋮ | | | |
| 1 | 0 | X | 0 | 0 | 0 | 0 |
| 0 | 0 | X | 1 | 1 | 1 | 1 |

HEARTBEAT COLLISION PREVENTION CIRCUIT AND METHOD

BACKGROUND OF THE INVENTION

1. Field of the Invention

The present invention relates in general to the prevention of a heartbeat collision, and more particularly to heartbeat collision prevention circuit and method in which accesses of computer stations to a data line are controlled in a data communication system in which the computer stations are networked, so that the computer stations can be fair in the data transmission order.

2. Description of the Prior Art

Generally, in a system, such as a local area network (LAN), in which many computers or workstations are interconnected to one another to share and exchange data among them it is most important to control efficiently the stations so that two or more of the stations cannot gain simultaneous accesses to a data line. To this end, there has been proposed a carrier sense multiple access (referred to hereinafter as CSMA) manner in which the first station occupying the data line acquires a priority, so as to transmit the data before others. However, in the CSMA manner, when two or more of the stations determine that the data line is not occupied by other stations and then transmit the data simultaneously, a data collision occurs, resulting in a degradation in a communication efficiency. In order to prevent such a data collision, a heartbeat collision prevention circuit is employed in each of adapter circuits connected respectively to the stations.

Referring to FIG. 1, there is shown an example of data communication networks employing the CSMA manner. As shown in this drawing, four individual stations 1-4 are connected in parallel to data and heartbeat signal lines through adapter circuits 6, respectively. Dip switches 5 are connected to the adapter circuits 6, respectively. Inherent addresses are assigned to the stations 1-4, respectively. A slot time indicating a data transmission time point is assigned to each of the stations 1-4 according to the assigned address and a heartbeat signal, so that each of the stations 1-4 can transmit the data for its slot time. The dip switches 5 are adapted to assign the addresses to the corresponding stations 1-4, respectively.

Referring to FIG. 2, there is shown a block diagram of a conventional heartbeat collision prevention circuit 20 which is disposed in each of the adapter circuits 6 in FIG. 1. As shown in this drawing, the conventional heartbeat collision prevention circuit 20 comprises an edge detector 21 for detecting an edge of an input heartbeat signal, a 12-bit counter 22 for inputting an output signal from the edge detector 21 as its load signal and a signal of 895 KHz as its clock signal and counting input data D0–D11 in response to the inputted signals, and a 4-bit counter 23 for inputting a carrier detect signal as its load signal and a signal of 112 KHz as its clock signal and counting input data D0–D3 in response to the inputted signals. The carrier detect signal indicates that a different station is now in data transmission.

The conventional heartbeat collision prevention circuit 20 also comprises a D flip-flop 24 for inputting an output signal Q11 from the 12-bit counter 22 as its clock signal, latching its inverted output signal /Q in response to the inputted signal and outputting the latched signal as a heartbeat signal, a D flip-flop 25 for inputting the output signal Q11 from the 12-bit counter 22 as its clock signal, latching an output signal from an AND gate AN1 in response to the inputted signal and outputting the latched signal as a transmit enable signal, an inverter IN1 for inverting a master select signal MSLT, a NAND gate NA1 for NANDing an output signal from the inverter IN1 and the output signal Q11 from the 12-bit counter 22 and outputting the resultant signal as an enable signal to the 12-bit counter 22, and an inverter IN2 for inverting an output signal Q3 from the 4-bit counter 23 and outputting the inverted signal as an enable signal to the 4-bit counter 23. The AND gate AN1 is adapted to AND the output signal Q3 from the 4-bit counter 23 and a service request signal and output the resultant signal to the D flip-flop 25.

The operation of the conventional heartbeat collision prevention circuit 20 with the above-mentioned construction will hereinafter be described.

When the heartbeat signal is generated from a master station, for example the station 4, for the data transmission and reception, it is applied to the edge detector 21 in the heartbeat collision prevention circuit 20 which is disposed in the adapter circuit 6 connected to each station. At this time, whenever the input heartbeat signal goes from "0" to "1" and vice-versa in logic, the edge detector 21 outputs a high logic signal as the load signal to the 12-bit counter 22. The 12-bit counter 22, when its clock signal goes form "0" to "1" in logic, performs the following operation. When the load signal from the edge detector 21 is "1" in logic, the 12-bit counter 22 loads the input data D0–D11. In the case where the load signal from the edge detector 21 is "0" in logic and the enable signal from the NAND gate NA1 is "1" in logic, the 12-bit counter 22 increments its count. If both the load signal from the edge detector 21 and the enable signal from the NAND gate NA1 are "0" in logic, the 12-bit counter 22 has no variation in the operation. Similarly, the 4-bit counter 23 is operated in the same manner as that of the 12-bit counter 22.

The 4-bit counter 23 acts as a time-out circuit which, for a predetermined time period after the transmission of the last data is completed, delays the transmission of the subsequent data to prevent the data collision. The output signal Q3 from the 4-bit counter 23 becomes "1" in logic when the data line of the network is free. On the other hand, whenever the carrier detect signal indicating that a different station is now in data transmission is made active, logic "0" is loaded into the 4-bit counter 23 and the output signal Q3 of the 4-bit counter 23 is thus set to "0" in logic to indicate that the data line is not free. If the carrier detect signal is made inactive, the 4-bit counter 23 starts the counting operation. The output signal Q3 from the 4-bit counter 23 goes "1" in logic when the count thereof becomes "8". The logic "1" output signal from the 4-bit counter 23 indicates that the data transmission is enabled because of the lapse of an interframe spacing time. Here, the interframe spacing time signifies a desired minimum time interval between frames in the data transmission in the unit of frame. If the output signal Q3 from the 4-bit counter 23 becomes "1" in logic at the moment that the interframe spacing time is ended, the enable signal from the inverter IN2 goes "0" in logic. As a result, no further increase is present in the count of the 4-bit counter 23 after the lapse of the interframe spacing time.

The 12-bit counter 22 is operated in response to the input heartbeat signal to assign the slot time to the corresponding station. Namely, when the output signal Q11 from the 12-counter 22 goes from "0" to "1" in logic, the slot time is assigned to the corresponding station. Whenever the input heartbeat signal is changed in logic, the output signal from the edge detector 21 goes "1" in logic, thereby causing the 12-bit counter 22 to load the input data D0–D11. Here, bits D5–D10 of the input data D0–D11 are a binary complement of the corresponding station address and a most significant bit D11 thereof is "0" so that an initial state of the output signal Q11 from the 12-bit counter 22 can become "0" in logic. Then, when the load of the input data D0–D11 is completed, the 12-bit counter 22 starts the counting operation. In this case, the number of counting times for a logic "0" to "1" transition of the output signal Q11 from the 12-bit counter 22 is 32 times the station address.

The operation of the 12-bit counter 22 after its output signal Q11 becomes "1" in logic is performed depending on whether the corresponding station is a master. If the corresponding station is not the master, the master select signal MSLT becomes "0" in logic. The NAND gate NA1 outputs a low logic signal as the enable signal to the 12-bit counter 22 because both the input signals are "1" in logic. As a result, the 12-bit counter 22 stops the counting operation.

On the other hand, if the corresponding station is the master, the master select signal MSLT becomes "1" in logic, thereby causing the NAND gate NA1 to output a high logic signal as the enable signal to the 12-bit counter 22. As a result, the 12-bit counter 22 continues to perform the counting operation even after the time-out. Namely, the 12-bit counter 22 generates the heartbeat signal continuously even when it can receive no heartbeat signal because of the time-out.

The D flip-flops 25 and 24 are adapted to generate the transmit enable signal and the heartbeat signal, respectively. The D flip-flop 25 is operated when the output signal Q11 from the 12-bit counter 22 is changed from "0" to "1" in logic, namely, the slot time is assigned to the corresponding station. At this time, if the service request signal from a control logic (not shown) is made active to indicate that the corresponding station is ready to transmit the data and the output signal Q3 from the 4-bit counter 23 becomes "1" in logic to indicate that the data line of the network is free, the output signal or the transmit enable signal from the D flip-flop 25 becomes "1" in logic. If the above two conditions are not satisfied, the transmit enable signal from the D flip-flop 25 remains at its logic "0" state unit the next slot time occurs. The transmit enable signal from the D flip-flop 25 is fed back to a preset terminal of the D flip-flop 25, so that it can remain at its logic "1" state regardless of the input signal D once being become "1" in logic. When the data transmission of the corresponding station is completed, a transmit complete signal from the control logic is applied to a clear terminal of the D flip-flop 25 to clear the D flip-flop 25. As a result, the transmit enable signal from the D flip-flop 25 returns to its logic "0" state. If the data transmission is completed as mentioned above, the data line of the network becomes free and each station gains access to the data line for its slot time after the lapse of the predetermined interframe spacing time.

On the other hand, in the case where a priority is assigned to a specified station, the D flip-flop 24 outputs the heartbeat signal if the specified station is the master. Then, when the output signal Q11 from the 12-bit counter 22 is changed from "0" to "1" in logic, the output signal Q from the D flip-flop 24 is changed from "0" to "1" and vice-versa in logic. In result, the heartbeat signal from the D flip-flop 24 makes a transition at the same time that the slot time is assigned to the master station. In the case where the specified station is not the master, the D flip-flop 24 is not operated.

FIGS. 3A to 3F are timing diagrams illustrating an example in which the slot times are assigned to the stations 1–4 in FIG. 1 in consideration of the heartbeat signal and the interframe spacing time, the heartbeat signal being generated from the master station 4. From these drawings, it can be seen that the heartbeat signal makes a transition at the same time that the slot time is assigned to the master station. Also, the stations 1–3 are timed out earlier than the master station. This reason is that the time-out is determined according to the predetermined time interval and the station addresses. Because the highest-order station address is assigned to the master station, other stations must be all timed out before the heartbeat signal from the master station makes a further transition.

In detail, when the heartbeat signal from the master station makes a first transition, the counters in the adapter circuits 6 of the stations 1–4 are initialized to perform the counting operations. Then, each station is timed out for a time-out interval based on the corresponding station address. In FIGS. 3A to 3F, a falling edge of each of time-out pulses in each station designates the transmission slot time ST of the corresponding station. For example, in the station 2, the first slot time occurs at a moment t2, at which the D flip-flop 25 generates the transmit enable signal upon receiving the service request signal from the control logic and the output signal from the 4-bit counter 23 indicating that the interframe spacing time has been satisfied. As shown in FIG. 3F, an end-of-data transmit signal EDT is generated between a moment t1 and the moment t2 and the interframe spacing time IFS is ended between the moment t2 and a moment t3. As a result, since the interframe spacing time or the second condition for generating the transmit enable signal at the first slot time in the station 2 is not satisfied, the station 2 cannot transmit the data till a moment t6 that the next slot time occurs.

In the station 3, the first slot time occurs at the moment t3. The station 3 can transmit the data at the moment t3 upon receiving the service request signal from the control logic, because the moment t3 is beyond the range of the interframe spacing time IFS. Provided that the station 3 has no data to transmit, the service request signal from the control logic becomes "0" in logic and the station 3 waits till a moment t7 that the next slot time occurs.

However, the above-mentioned conventional heartbeat collision prevention circuit has a disadvantage in that the priority is assigned to only the specified station because the transmission order is fixed due to the slot time fixed every station. Namely, the stations cannot gain fair accesses to a channel. Also, in the case where many stations are connected to the network, the heartbeat signal from the master station has a long duration. The long duration of the heartbeat signal cause the time interval between the data transmissions to become long, resulting in a degradation in a performance of the entire network.

SUMMARY OF THE INVENTION

Therefore, the present invention has been made in view of the above problems, and it is an object of the present invention to provide heartbeat collision prevention circuit and method in which a transmission priority is not fixed to a specified station but rotated through all stations, so that the stations can be fair in the data transmission order.

In accordance with one aspect of the present invention, in a network in which a plurality of stations are connected to data and heartbeat lines, said data line transmitting data therethrough, said heartbeat line transmitting a heartbeat signal therethrough, there is provided a heartbeat collision prevention circuit comprising first delay means for delaying a clock signal; ORing means for ORing an output signal from said first delay means and said heartbeat signal; edge detection means for detecting an edge of an output signal from said ORing means; a shift register for loading data from a central processing unit and shifting the loaded data in response to an output signal from said edge detection means, the data from said central processing unit being defined to determine a data transmission priority; second delay means being enabled in response to the output signal from said edge detection means to delay the clock signal; ANDing means for ANDing an output signal from said second delay means and an enable signal; a slot time counter being enabled in response to the output signal from said edge detection means to count an output signal from said ANDing means; signal operation means for logically combining a plurality of output signals from said slot time counter and a plurality of output signals from said shift register and outputting the resultant signal as a slot time; and reset means for logically combining an output signal from said signal operation means and the output signal from said edge detection means and outputting the resultant signal as a reset signal to said slot time counter.

In accordance with another aspect of the present invention, in a circuit for controlling accesses of a plurality of stations to a data line in a network in which said plurality of stations are connected to said data line and a heartbeat line, said data line transmitting data therethrough, said heartbeat line transmitting a heartbeat signal therethrough, there is provided a heartbeat collision prevention method comprising the steps of detecting an edge of said heartbeat signal; loading data from a central processing unit and shifting the loaded data in response to the detected edge of said heartbeat signal to rotate a data transmission priority; logically combining a value obtained by counting a clock signal and a value obtained by shifting the loaded data and outputting the resultant signal as a slot time; and transmitting data when said slot time becomes low in logic.

BRIEF DESCRIPTION OF THE DRAWINGS

The above and other objects, features and advantages of the present invention will be more clearly understood from the following detailed description taken in conjunction with the accompanying drawings, in which:

FIG. 6 is a view illustrating a truth table of a counter in FIG. 4.

DETAILED DESCRIPTION OF THE PREFERRED EMBODIMENTS

Figure 4:
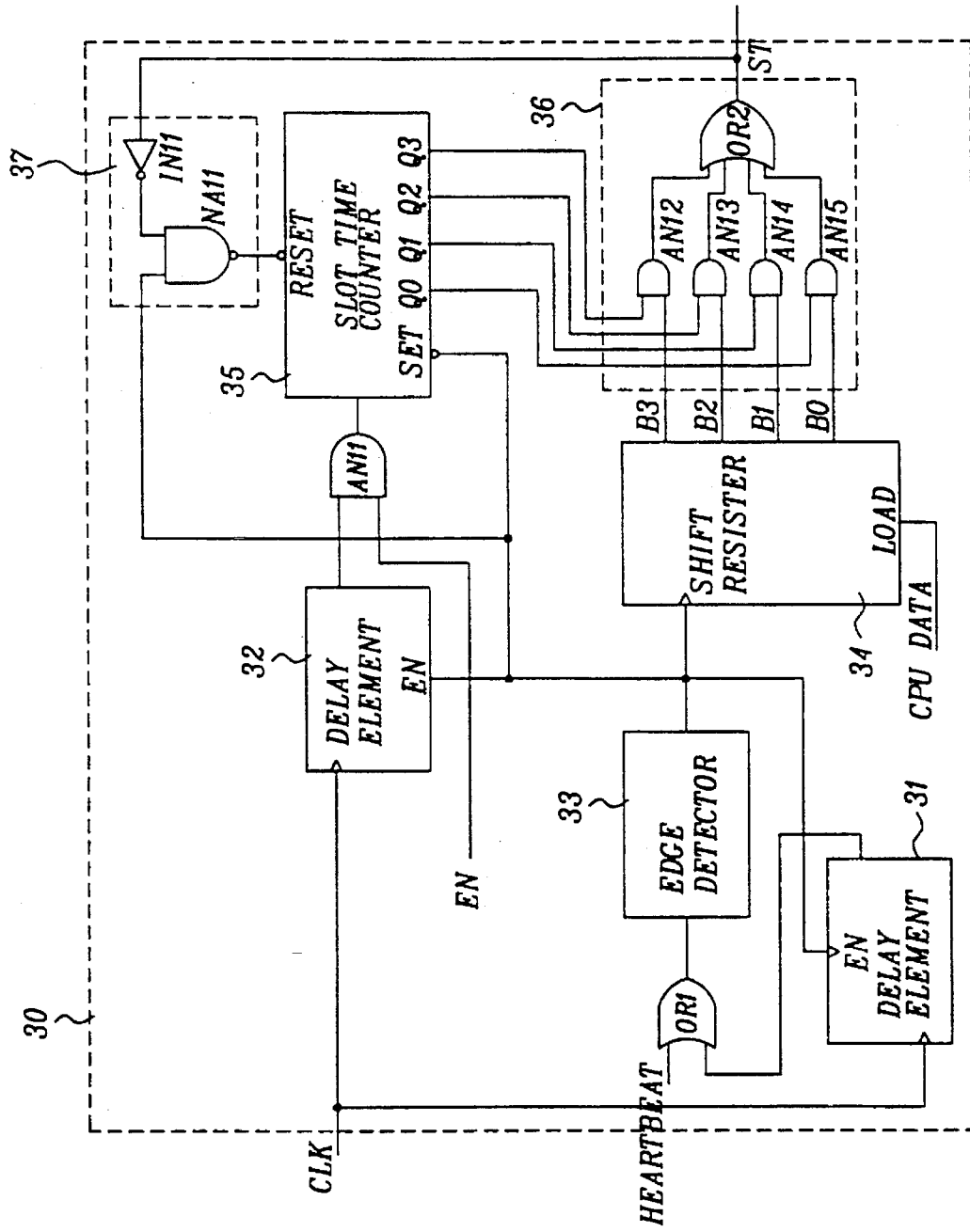
FIG. 4 is a block diagram of a heart collision prevention circuit in accordance with the present invention.

Referring to FIG. 4, there is shown a block diagram of a heartbeat collision prevention circuit 30 in accordance with the present invention. As shown in this drawing, the heartbeat collision prevention circuit 30 comprises a delay element 31 for delaying a clock signal CLK, an OR gate OR1 for ORing an output signal from the delay element 31 and an input heartbeat signal, an edge detector 33 for detecting an edge of an output signal from the OR gate OR1, a 4-bit shift register 34 for loading data from a central processing unit (referred to hereinafter as CPU), now shown, and shifting the loaded data in response to an output signal from the edge detector 33, a delay element 32 being enabled in response to the output signal from the edge detector 33 to delay the clock signal CLK, an AND gate AN11 for ANDing an output signal from the delay element 32 and an enable signal EN, a 4-bit slot time counter 35 being set in response to the output signal from the edge detector 33 to count an output signal from the AND gate AN11, a signal operation unit 36 for logically combining output signals Q0–Q3 from the slot time counter 35 and output signals B0–B3 from the shift register 34 and the outputting the resultant signal as a slot time, and a reset unit 37 for logically combining an output signal from the signal operation unit 36 and the output signal from the edge detector 33 and outputting the resultant signal as a reset signal to the slot time counter 35.

The signal operation unit 36 includes AND gates AN12–AN15 for ANDing the output signals Q0–Q3 from the slot time counter 35 and the output signals B0–B3 from the shift register 34, respectively, and an OR gate OR2 for ORing output signals from the AND gates AN12–AN15 and outputting the resultant signal as the slot time.

The reset unit 37 includes an inverter IN11 for inverting the output signal from the signal operation unit 36, and a NAND gate NA11 for NANDing an output signal from the inverter IN11 and the output signal from the edge detector 33 and outputting the resultant signal as the reset signal to the slot time counter 35.

The operation of the heartbeat collision prevention circuit 30 with the above-mentioned construction in accordance with the present invention will hereinafter be described in detail with reference to FIGS. 5A to 5F, which are timing diagrams illustrating an example in which the slot times are assigned to stations in accordance with the present invention. In accordance with the preferred embodiment of the present invention, the slot time counter 35 and the shift register 34 are 4-bit counter and register, respectively, on the assumption that four stations are networked.

Figure 1:
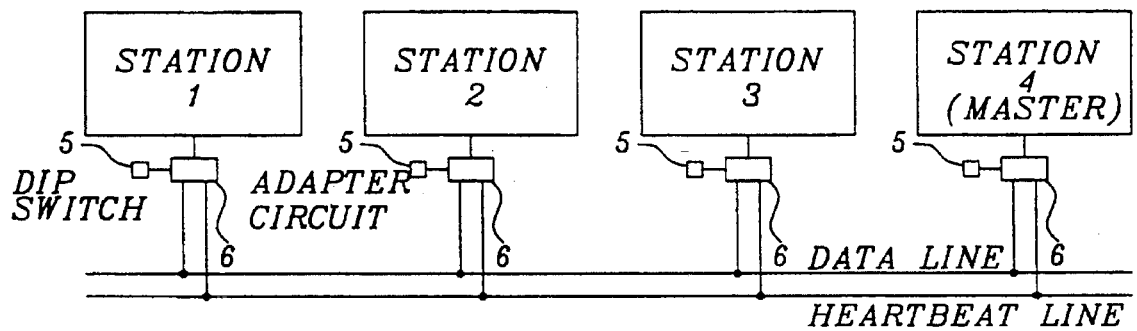
FIG. 1 is a view illustrating an example of data communication networks employing a CSMA manner.
Figure 2:
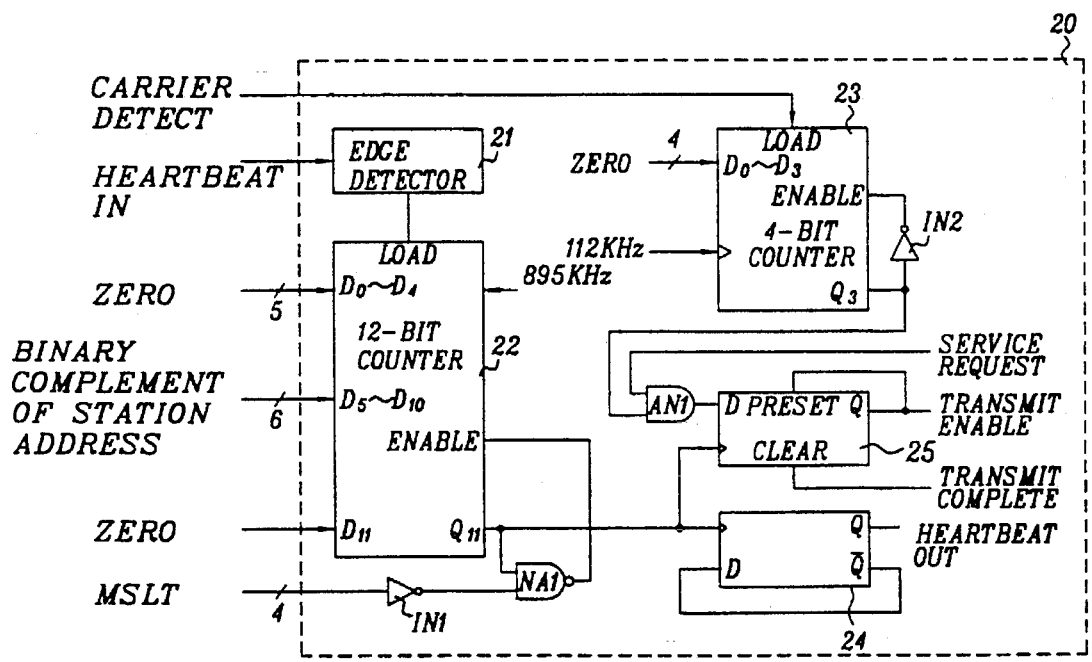
FIG. 2 is a block diagram of a conventional heartbeat collision prevention circuit.
Figure 3A:
FIGS. 3A to 3F are timing diagrams illustrating an example in which slot times are assigned to stations by the circuit in FIG. 2.
Figure 3B:
Figure 3C:
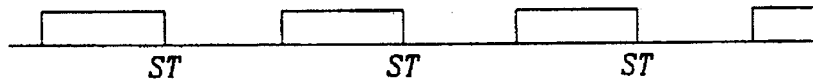
Figure 3D:
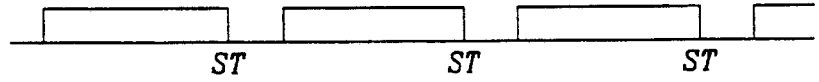
Figure 3E:
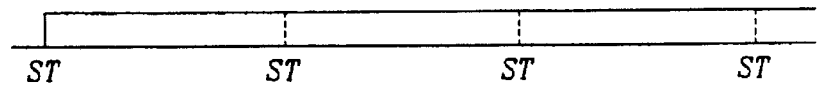
Figure 3F:
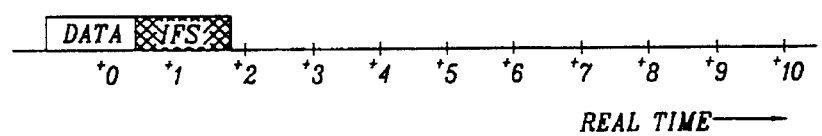
Figure 5A:
FIGS. 5A to 5F are timing diagrams illustrating an example in which slot times are assigned to stations in accordance with the present invention.
Figure 5B:
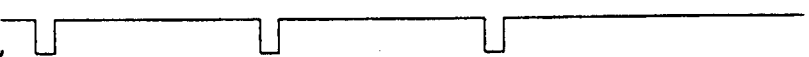
Figure 5C:
Figure 5D:
Figure 5E:
Figure 5F:

In the network as shown in FIG. 1, if a certain one of the stations acquiring the transmission priority completes the data transmission, the heartbeat signal therefrom is applied to the heartbeat collision prevention circuit 30 which is disposed in the adapter circuit 6 connected to each station. Then in the heartbeat collision prevention circuit 30, the OR gate OR1 ORes the input heartbeat signal and the clock signal CLK delayed by the delay element 31 and outputs the resultant signal as shown in FIG. 5A to the edge detector 33. The edge detector 33 generates a signal as shown in FIG. 5B whenever it detects a falling edge of the output signal from the OR gate OR1. As shown in FIG. 5B, the output signal from the edge detector 33 remains at its low logic state for a predetermined time period (9.6 μs) after the falling edge detection by the edge detector 33. The output signal from the edge detector 33 is then applied to the delay elements 31 and 32, the shift register 34, the reset unit 37 and the slot time counter 35. The slot time counter 35 is not operated for a low duration (9.6 μs) of the output signal from the edge detector 33 because it inputs the output signal from the edge detector 33 at its set terminal. This non-operation of the slot time counter 35 satisfies the interframe spacing time. At this time, the output signals Q0–Q3 from the slot time counter 35 are all set to "1" in logic since the output signal from the edge detector 33 is low ("0") in logic.

After the interframe spacing time is satisfied as mentioned above, the AND gate AN11 transfers the clock signal CLK delayed by the delay element 32 to the slot time counter 35 when the enable signal EN is high in logic. Then, the slot time counter 35 performs a down counting operation every a rising edge of the clock signal from the AND gate AN11. As a result of the down counting operation, the output signals Q0–Q3 from the slot time counter 35 are generated as shown in a truth table of FIG. 6. Namely, when the signal which is applied from the edge detector 33 to the set terminal of the slot time counter 35 is "0" in logic, the output signals Q0–Q3 from the slot time counter 35 become all "1" in logic. If the slot time counter 35 receives the clock signal from the AND gate AN11 under the condition that both the signals at its set and reset terminals are "1" in logic, it down-counts the clock signal from the AND gate AN11. On the other hand, in the case where the signal which is applied from the reset unit 37 to the reset terminal of the slot time counter 35 is "0" in logic, the output signal Q0–Q3 from the slot time counter 35 become all "0" in logic.

On the other hand, the CPU data is applied as the load signal to the shift register 34. The CPU data is defined differently every station to determine the priorities of the stations. Namely, the CPU data is defined in such a manner that high durations of the slot times of the stations can be different from one another as shown in FIGS. 5C to 5F. The CPU data is loaded only once at an initial operation state of each station. The shift register 34 loads the CPU data and shifts the loaded data in response to the output signal from the edge detector 33. In other words, whenever the output signal from the edge detector 33 inputting the heartbeat signal goes from "1" to "0" in logic, the shift register 34 shifts the loaded data by one bit.

Then, in the signal operation unit 36, the output signals B0–B3 from the shift register 34 are applied to one input terminals of the AND gates AN12–AN15, the other input terminals of which are applied with the output signals Q0–Q3 from the slot time counter 35, respectively. The AND gates AN12–AN15 AND the inputted signals, respectively. Then, the OR gate OR2 ORes the output signals from the AND gates AN12–AN15 and outputs the resultant signal as the slot time ST.

At this time, the transmission priority is assigned to one of the stations in which the slot time ST goes low in logic. The assigned station performs the data transmission if it has the data to transmit. In the case where the assigned station has no data to transmit, the priority is assigned to the next station in which the slot time ST goes low in logic. As the slot time counter 35 is reset by the reset unit 37, the station in which the slot time ST is low in logic waits until the next heartbeat signal is inputted. In other words, in the reset unit 37, when the output signal from the signal operation unit 36 is low in logic, it is inverted into high logic by the inverter IN11 and then applied to one input terminal of the NAND gate NA11, the other input terminal of which is applied with the high logic signal from the edge detector 33. As a result, the NAND gate NA11 outputs a low logic signal to the reset terminal of the slot time counter 35, thereby causing the slot time counter 35 to be cleared.

By the way, if further data to be transmitted is present after the data transmission is completed, the delay 31 is operated to output the signal as shown in FIG. 5A to the OR gate OR1. The edge detector 33 detects the falling edge of the output signal from the OR gate OR1 and then sets the slot time counter 35 after the lapse of the predetermined time period from the falling edge detection. As being set, the slot time counter 35 performs the down counting operation. Also, the shift register 34 loads the CPU data and shifts the loaded data in response to the output signal from the edge detector 33. The signal operation unit 36 logically combines the output signals Q0–Q3 from the slot time counter 35 and the output signals B0–B3 from the shift register 34 and outputs the resultant signal as the slot time ST. As a result, the station in which the slot time ST is low in logic performs the data transmission if it has the data to transmit.

With the above operation repeatedly performed, the data transmission priorities are determined in the order of the stations 1, 2, 3 and 4 at the first heartbeat, the stations 4, 1, 2 and 3 at the second heartbeat and the stations 3, 4, 1 and 2 at the third heartbeat, according to the slot times ST of the stations as shown in FIGS. 5C to 5F.

As apparent from the above description, according to the present invention, the heartbeat collision prevention circuit can prevent a specified station from continuing to have the data transmission priority and occupy the data line. The data transmission priority is rotated through the stations to afford equal opportunities of the data transmission to the stations. Therefore, the heartbeat collision prevention circuit has the effect of enhancing the transmission efficiency.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. In a network in which a plurality of stations are connected to data and heartbeat lines, said data line transmitting data therethrough, said heartbeat line transmitting a heartbeat signal therethrough, a heartbeat collision prevention circuit comprising:

first delay means for delaying a clock signal;

ORing means for ORing an output signal from said first delay means and said heartbeat signal;

edge detection means for detecting an edge of an output signal from said ORing means;

a shift register for loading data from a central processing unit and shifting the loaded data in response to an output signal from said edge detection means, the data from said central processing unit being defined to determine a data transmission priority;

second delay means being enabled in response to the output signal from said edge detection means to delay the clock signal;

ANDing means for ANDing an output signal from said second delay means and an enable signal;

a slot time counter being enabled in response to the output signal from said edge detection means to count an output signal from said ANDing means;

signal operation means for logically combining a plurality of output signals from said slot time counter and a plurality of output signals from said shift register and outputting the resultant signal as a slot time; and reset means for logically combining an output signal from said signal operation means and the output signal from said edge detection means and outputting the resultant signal as a reset signal to said slot time counter.

2. A heartbeat collision prevention circuit as set forth in claim 1, wherein said first delay means is adapted to output the clock signal to said ORing means if further data to be transmitted is present after data transmission is completed.

3. A heartbeat collision prevention circuit as set forth in claim 1, wherein said shift register is adapted to shift the loaded data by one bit whenever a rising edge or a falling edge of the output signal from said edge detection means is detected.

4. A heartbeat collision prevention circuit as set forth in claim 1, wherein said ANDing means is adapted to transfer the output signal from said second delay means to said slot time counter in response to the enable signal after the lapse of a predetermined time period from the edge detection by said edge detection means.

5. A heartbeat collision prevention circuit as set forth in claim 1, wherein said signal operation means includes:
 a plurality of AND gates for ANDing the plurality of output signals from said slot time counter and the plurality of output signals from said shift register, respectively; and
 an OR gate for ORing output signals from said plurality of AND gates and outputting the resultant signal as the slot time.

6. A heartbeat collision prevention circuit as set forth in claim 1, wherein said shift register has the bits number equal to the number of said plurality of stations in the network.

7. A heartbeat collision prevention circuit as set forth in claim 1, wherein said slot time counter has the bits number equal to the number of said plurality of stations in the network.

8. A heartbeat collision prevention circuit as set forth in claim 1, wherein said slot time counter is set in response to the output signal from said edge detection means to downcount the clock signal.

9. A heartbeat collision prevention circuit as set forth in claim 1, wherein the output signal from said edge detection means remains at its low logic state for a predetermined time period whenever an edge of said heartbeat signal is detected by said edge detection means.

10. A heartbeat collision prevention circuit as set forth in claim 9, wherein said predetermined time period satisfies an interframe spacing time, said interframe spacing time being a desired minimum time interval between frames in data transmission in the unit of frame.

11. A heartbeat collision prevention circuit as set forth in claim 5, wherein said plurality of AND gates have the bits number equal to the number of said plurality of stations in the network.

12. In a circuit for controlling accesses of a plurality of stations to a data line in a network in which said plurality of stations are connected to said data line and a heartbeat line, said data line transmitting data therethrough, said heartbeat line transmitting a heartbeat signal therethrough; a heartbeat collision prevention method comprising the steps of:
 (a) detecting an edge of said heartbeat signal;
 (b) loading data indicative of a data transmission priority from a central processing unit and shifting the data in response to the detected edge of said heartbeat signal to rotate the data transmission priority among said plurality of stations;
 (c) logically combining a count value obtained by counting a clock signal and a value obtained by shifting the loaded data and outputting the resultant signal as a slot time; and
 (d) transmitting data when said slot time becomes low in logic.

13. A heartbeat collision prevention circuit as set forth in claim 12, wherein the data from said central processing unit is defined differently every station to determine the data transmission priority.

14. A heartbeat collision prevention circuit as set forth in claim 12, wherein said step (a) of detecting the edge of said heartbeat signal includes the step of outputting a low logic signal for a predetermined time period whenever the edge of said heartbeat signal is detected, to satisfy an interframe spacing time.

15. A heartbeat collision prevention circuit for controlling access of a station to a data line in a network in which said station is connected to said data line and a heartbeat line, said heartbeat line transmitting a heartbeat signal therethrough, said heartbeat collision prevention circuit comprising:
 a detector for detecting a heartbeat signal and transmitting a first signal representing the heartbeat signal during a slot time on said heartbeat line;
 a shift register receiving data indicative of transmission priority, said shift register being coupled to said detector such that said shift register shifts the data in response to the first signal from said detector to output a plurality of second signals;
 a slot time counter coupled to said detector, said slot time counter counts a third signal in response to the first signal of said detector such that said slot time counter outputs a plurality of fourth signals; and
 a signal operation unit coupled to said shift register and slot time counter to determine the slot time based on said plurality of second signals from said shift register and said plurality of fourth signals from said slot time counter, said slot time defining a time interval for said detector to transmit said first signal on said heartbeat line, thereby preventing heartbeat collision.

16. The heartbeat collision prevention circuit of claim 15 further comprising a reset unit to reset said slot time counter coupled to said detector and said signal operation unit, a reset signal being generated based on said first signal and said slot time.

17. The heartbeat collision prevention circuit of claim 16, wherein said reset signal is applied to said slot time counter.

18. The heartbeat collision prevention circuit of claim 15 further comprising:
 a first delay element to receive a clock signal; and
 a first logic gate coupled to receive an output signal of said first delay element and coupled to receive a heart beat signal such that said first logic gate performs a first logical operation between the output signal and the heart beat signal, wherein
 said detector detects an output signal of said first logic gate.

19. The heartbeat collision prevention circuit of claim 15 further comprising:
 a second delay element to receive a clock signal;
 a second logic gate adapted to generate said third signal based on an output from said second delay means and an enable signal.

20. The heartbeat collision prevention circuit of claim 15, wherein said signal operation unit comprises a plurality of first logic gates coupled to receive a corresponding one of said plurality of second signals from said shift register and fourth signals from said slot time counter.

* * * * *